Figure 1:
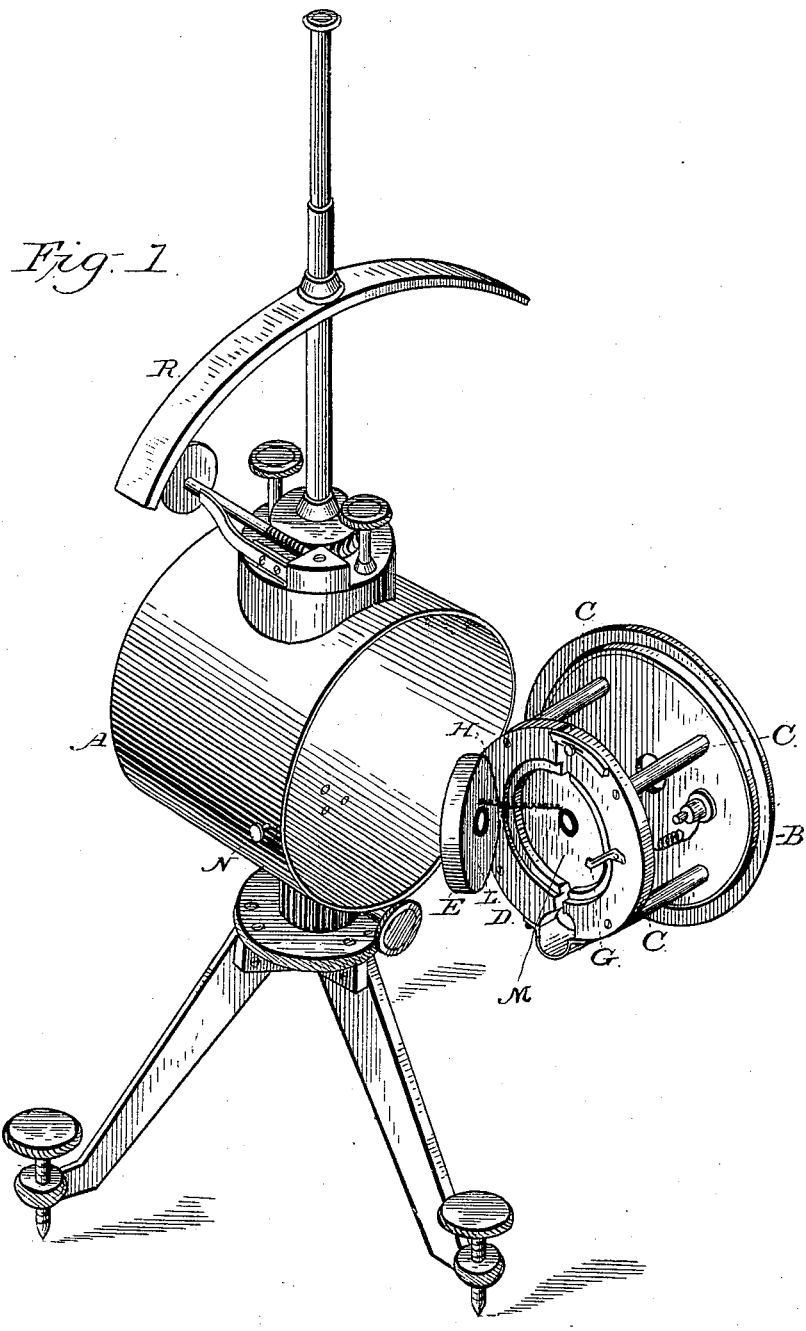

(No Model.)

2 Sheets—Sheet 1.

R. J. PRATT.

REFLECTING GALVANOMETER.

No. 323,203.

Patented July 28, 1885.

WITNESSES

INVENTOR
R. J. Pratt
By Attorney (No Model.) 2 Sheets—Sheet 2.
R. J. PRATT.
REFLECTING GALVANOMETER.
No. 323,203. Patented July 28, 1885.
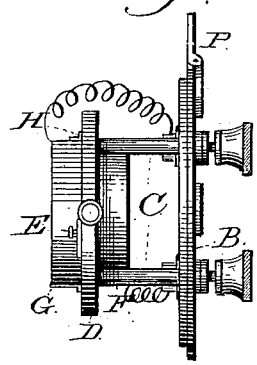
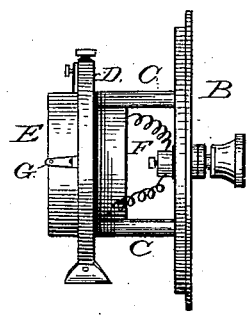
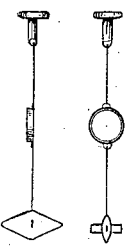
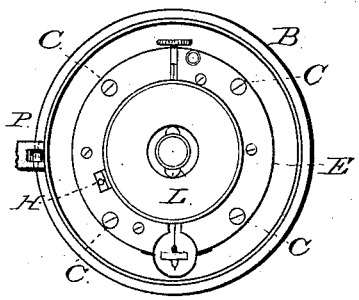
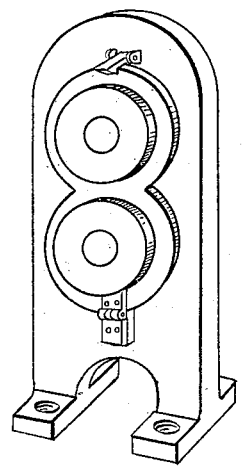
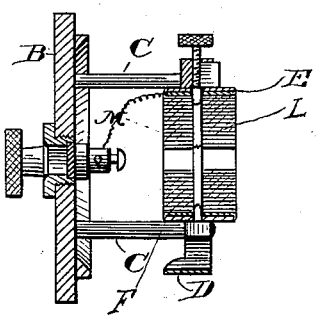
WITNESSES:
INVENTOR
R. J. Pratt
BY
John C. Rennie
ATTORNEY

UNITED STATES PATENT OFFICE.

ROBERT J. PRATT, OF GREENBUSH HEIGHTS, ASSIGNOR TO THE ELECTRIC MANUFACTURING COMPANY, OF TROY, NEW YORK.

REFLECTING-GALVANOMETER.

SPECIFICATION forming part of Letters Patent No. 323,203, dated July 28, 1885.

Application filed January 26, 1885. (No model.)

*To all whom it may concern:*

Be it known that I, ROBERT J. PRATT, a citizen of the United States, residing at Greenbush Heights, in the county of Rensselaer and State of New York, have invented certain new and useful Improvements in Reflecting-Galvanometers; and I do hereby declare the following to be a full, clear, and exact description of the invention, such as will enable others skilled in the art to which it appertains to make and use the same.

My invention relates to that class of current-measurers and telegraphic receivers known as "reflecting-galvanometers," wherein the deflections of the needle are made sensible by means of a bright image or spot reflected upon the face of a horizontal graduated scale. The spot referred to is produced by a lamp placed in the rear of the scale and shining through an opening in the latter upon a mirror within the galvanometer, and is sometimes crossed by a sharply-defined vertical black line, resulting from the light intercepted by a thin wire stretched across the scale-opening. For most purposes, however, the spot alone is preferred. In different and well-known forms of these galvanometers the mirror is concave or plane, as the case may be, and the readings are taken with or without a telescope, all of which is well understood by those familiar with their use. To the mirror is rigidly attached the needle, and both are suspended, in a familiar type of these instruments, at the center of a vertically-disposed fine-wire coil by means of a silken fiber, the said coil being connected with the conductor which furnishes the working-current. A lower needle, connected with the upper by means of an aluminium wire, forms with the latter an astatic pair, and in some forms of galvanometers is itself centered within a lower coil with differential effects.

In the use of the galvanometer it is, as is well known, frequently desirable, for various conditions of current, to alter the astatic system, or also substitute for the coil or coils temporarily employed another or others of greater or less resistance. This substitution should be made with as little jar as possible to the suspended system, which, by reason of its extreme delicacy and the fragile character of the silken fiber, is liable to serious displacement or even absolute rupture during the transfer. It is also desirable that the coils should be removed or inserted as expeditiously and readily as possible, and that they should be easily and conveniently accessible. Their frame-works, moreover, should oppose no obstacle to the operation of hanging the suspended system, or the alteration of the same, and should be so hung themselves as not to endanger the integrity of the latter by accidental closing during adjustment. These ends I secure by means of the construction hereinafter described and illustrated, producing at the same time an instrument of economical and durable character, well suited to the purposes for which it is designed.

Referring more particularly to the accompanying drawings, illustrative of my invention, and wherein like letters of reference indicate like parts throughout the several figures, Figure 1 is a perspective view of a galvanometer of the tripod pattern embodying my improvements. Fig. 2 is a top plan view of the back plate, upon which are mounted the coils and the suspension system. Fig. 3 is a side elevation of the same, and Fig. 4 is a front elevation. Fig. 5 is a detail view representing front and side elevations of the suspension system detached from the remaining parts. Fig. 6 is a perspective view showing the application of operation of my invention to the square type of galvanometer. Fig. 7 represents a cross-sectional view taken through the center of the back plate and its accessories.

In the drawings, A represents the casing of a galvanometer surmounted by the ordinary weak magnet, R, and its adjusting mechanism. A back plate, B, is hinged to the casing at P, being held in position, when the instrument is closed, by means of the spring-catch N, a button, or other similar device. From this back plate extend a suitable number of posts, C, to which is firmly attached the coil-bearing frame D, having an internal annular flange, forming seats for the reception of the coils L M, and of sufficient width to permit the suspension of the astatic system shown in Fig. 5 between them. The coils L M fit within rings E F, adapted to receive them, and being easily inserted and removed therefrom are readily interchangeable with others when a change is desired. The front ring, E, is hinged to the frame-work D, as shown at H, at a point below the horizontal diameter of said frame-work, and is held in position when closed by the friction-spring G.

The coil-connections are made with the binding-posts, and the astatic system hung in the usual manner.

It will be observed that in my invention the entire internal mechanism of the galvanometer is mounted directly upon the back plate, which is hinged in the central plane of casing A. This enables me to gain immediate access to the working parts when a change is desired without shock or jar to the suspended system, which is constantly maintained during such movement in a vertical position. The front ring, E, being, moreover, hinged to the frame-work D, below the horizontal diameter of the latter, can be immediately dropped down to one side, disclosing the suspended system, and, by reason of the position of its hinge, is prevented from closing accidentally during the operation of adjusting said system. The location of the coils within rings is also a valuable feature of my improvement, as it greatly facilitates their insertion and removal.

It is evident that the feature of hinging the coils can be embodied in other types of galvanometers than that having the horizontal cylindrical casing. Thus, in Fig. 6, I have illustrated its application to a form of galvanometer wherein the coils are supported within a yoke mounted upon standards. In this case the yoke containing the rings is hinged at the bottom, as shown, to a cross-piece joining the standards, and is held in the vertical position by a spring-catch in the upper curved or horseshoe portion joining said standards.

Having thus described my invention, what I claim, and desire to secure by Letters Patent, is—

1. A reflecting-galvanometer wherein the coils and suspended system are attached to the back plate, said back plate being hinged to the main casing and adapted to be secured in position by a catch or its equivalent upon the casing, substantially as shown and described.

2. A reflecting-galvanometer wherein the coils located in front of the suspended system are adapted to slip into rings, said rings being hinged and held in position by a catch or its equivalent, substantially as shown and described.

3. A reflecting-galvanometer having a hinged back and removable swinging coils, substantially as described.

In testimony whereof I affix my signature in presence of two witnesses.

ROBERT J. PRATT.

Witnesses:
J. C. PENNIE,
J. R. NOTTINGHAM.